United States Patent [19]

Barnard et al.

[11] Patent Number: 4,811,317

[45] Date of Patent: Mar. 7, 1989

[54] CLOCK RESYNCHRONIZATION AFTER A TRACK JUMP

[75] Inventors: James A. Barnard, Conesus; Michael G. Fairchild, Rochester, both of N.Y.

[73] Assignee: Eastman Kodak Company, Rochester, N.Y.

[21] Appl. No.: 66,805

[22] Filed: Jun. 25, 1987

[51] Int. Cl.⁴ .............................................. G11B 17/22
[52] U.S. Cl. ........................................ 369/32; 369/50; 358/322; 358/338; 358/907
[58] Field of Search ...................... 358/322, 338, 907; 360/10.1; 369/32, 50

[56] References Cited

U.S. PATENT DOCUMENTS

| | | | |
|---|---|---|---|
| 4,330,880 | 5/1982 | Van Dijk | 369/32 |
| 4,422,176 | 12/1983 | Summers | 375/120 |
| 4,535,459 | 8/1985 | Hogge, Jr. | 375/80 |
| 4,544,872 | 10/1985 | Hirano et al. | 360/77 |
| 4,594,701 | 6/1986 | Earman et al. | 369/43 |
| 4,613,963 | 9/1986 | Hirano | 358/907 |

Primary Examiner—Patrick R. Salce
Assistant Examiner—Anita M. Ault
Attorney, Agent, or Firm—Dennis P. Monteith

[57] ABSTRACT

In an information-bearing disk having, along concentric record tracks, pre-written equally spaced tracking pads which may or may not be aligned radially from one track to another, circuitry serves for improving the response time of a disk drive mechanism during a track-jump operation, i.e. when a read/write transducer head moves radially from one record track to any other track. The circuitry includes a phase-locked loop (PLL), coupled to the transducer head and responsive to a pulsed signal corresponding to the frequency at which the tracking pads sweep past the head, and thereby the actual speed of the disk, for producing an adjustable clock signal which controls the rate at which user data is transferred to or from track segments between adjacent tracking pads. A flip flop, in response to a track-jump operation, resynchronizes the clock signal by resetting the phase of the PLL to match the phase of the tracking pads on the new track while the PLL temporarily latches the frequency of the clock signal until the track jump is completed. This improves the overall response time of a data transfer operation by maintaining an appropriate clock signal with minimal loop error in the presence of a difference in phase between the tracking pads on the previous track and the tracking pads on the track to which the transducer head has been moved.

7 Claims, 4 Drawing Sheets

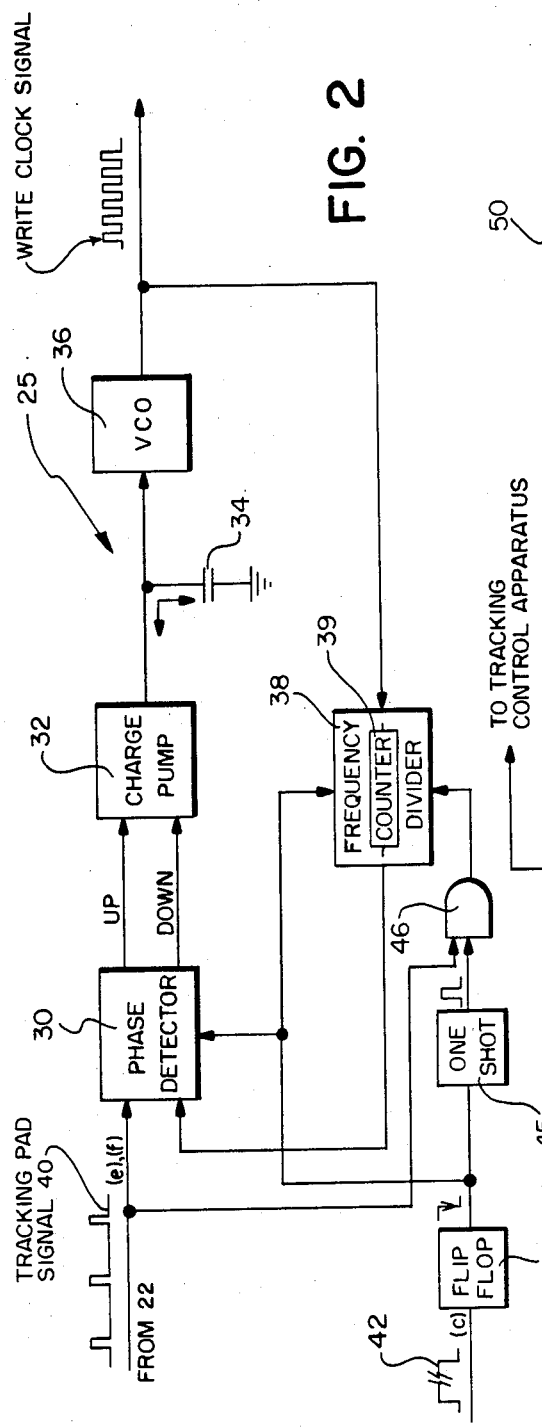
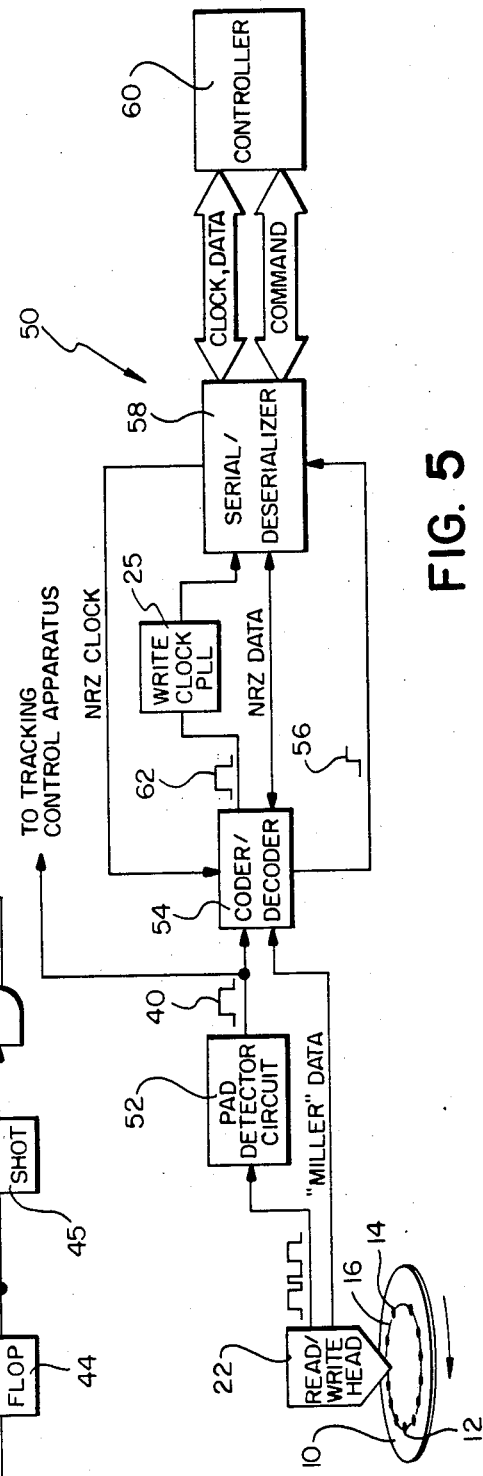
FIG. 2
FIG. 5

CLOCK RESYNCHRONIZATION AFTER A TRACK JUMP

CROSS-REFERENCE TO A RELATED APPLICATION

Reference is hereby made to U.S. patent application Ser. No. 943,396 entitled Distribution of Clock Indicia for A Quasi-Constant Linear-Velocity Disk, by J. Barnard, filed on Dec. 19, 1986.

1. Field of the Invention

The present invention relates generally to digital data recording on a disk. More particularly, the invention relates to improving the response time of a disk drive mechanism when a transducer read/write head jumps radially from one record track to another track on the disk.

2. Description Relative To The Prior Art

A technique, known in the prior art, for writing or playing back user data from a disk includes pre-recording indicia, for example tracking information, at distinct positions angularly spaced equally along each record track of the disk. Each entity of tracking information, hereinafter referred to as a tracking pad, in addition to its customary function of tracking control, serves conveniently in a recording operation to provide a clock synchronization pulse which provides for recording user data between, but not on, adjacent tracking pads, even in the presence of random fluctuations in the velocity of the disk.

With a disk which uses tracking pads, or for that matter any other pre-recorded equally spaced indicia, the frequency of occurrence of the tracking pads during a recording or a playback operation may not be a fixed integer number with each revolution of the disk. In other words, the length of each track revolution may not be an integer multiple of the linear distance between adjacent tracking pads on the same track. If that were the case, the tracking pads, as viewed in the radial direction, would not be aligned from one track to another track. Accordingly, when the tracking pads are misaligned and a transducer head moves radially from one track to another, there is a discontinuity in the periodicity of the timing between the first tracking pad accessed when tracing the "new" destination track and the last tracking pad encountered prior to leaving the "old" track. With a write clock (or read clock) phase locked to the tracking pads, a track-jump operation causes a phase difference between the clock signal and an input tracking pad signal from the new track; the phase-locked loop (PLL) attempts to make up for this discontinuity. Until the PLL is stable, data transfer (either recording or playback) must be interrupted which, of course, is disadvantageous as it slows the average speed at which data may be transferred to and from the disk. If, on the other hand, data transfer was commenced before the PLL had stabilized, the clock would have the wrong frequency. In a recording operation, user data could be written over the tracking pads, thereby potentially disrupting a subsequent tracking operation and possibly rendering user data unreadable.

SUMMARY OF THE INVENTION

In view of the foregoing, an object of the invention is to improve the response time of a disk drive data-transfer operation whenever a transducer read/write head jumps radially from one record track to another on a disk having, throughout concentric track revolutions, pre-written equally spaced indicia which may be misaligned radially from one track to another. This object is achieved by providing a phase-locked loop (PLL) which "holds" its output clock frequency while the input of a phase detector of the PLL is inhibited during a track jump. When the first indicium on the destination track is encountered after the jump time, the phase of the feedback of the PLL is immediately reset to match the phase of the detection signal from the "new" track. With this arrangement, the PLL remains at the frequency of the indicia on the old track and requires minimal phase correction in response to the indicia on the newly accessed track.

In a preferred embodiment, the invention provides means for inhibiting the PLL for each track-jump operation for a predetermined time which is at least as great as the maximum time needed for the transducer head to move to another track. To that end, the PLL has a time constant which holds the frequency of its output clock signal for a time sufficient to assure that the track-jump operation is completed. Then, after the PLL is reenabled and the first indicium is detected on the track to which the head has been moved—the destination track—the PLL is reset to have a phase difference of zero with respect to the indicia on the new track.

In an alternate preferred embodiment, any phase difference between the clock signal of the PLL and the indicia of the original track is stored just before a track jump. Then, after completion of the track-jump operation, the PLL is reset to have the same phase difference with respect to the indicia of the new track.

The invention serves to more quickly stabilize the PLL and to thereby reduce the time during which data transfer is interrupted by a track-jump operation. This and other advantages of the invention will become more apparent in the detailed description of a preferred embodiment presented below.

DESCRIPTION OF THE DRAWINGS

In the detailed description of a preferred embodiment of the invention presented below, reference is made to the accompanying drawings, in which:

FIG. 2 is a schematic in block diagram form of circuitry, in accordance with the invention, for controlling the frequency and the phase of a write clock using the occurrence of tracking pads on the disk of FIG. 1;

FIG. 5 is a schematic in block diagram form of circuitry for writing user data on each track segment between adjacent tracking pads on the disk of FIG. 1.

DETAILED DESCRIPTION OF A PREFERRED EMBODIMENT

Figure 1:
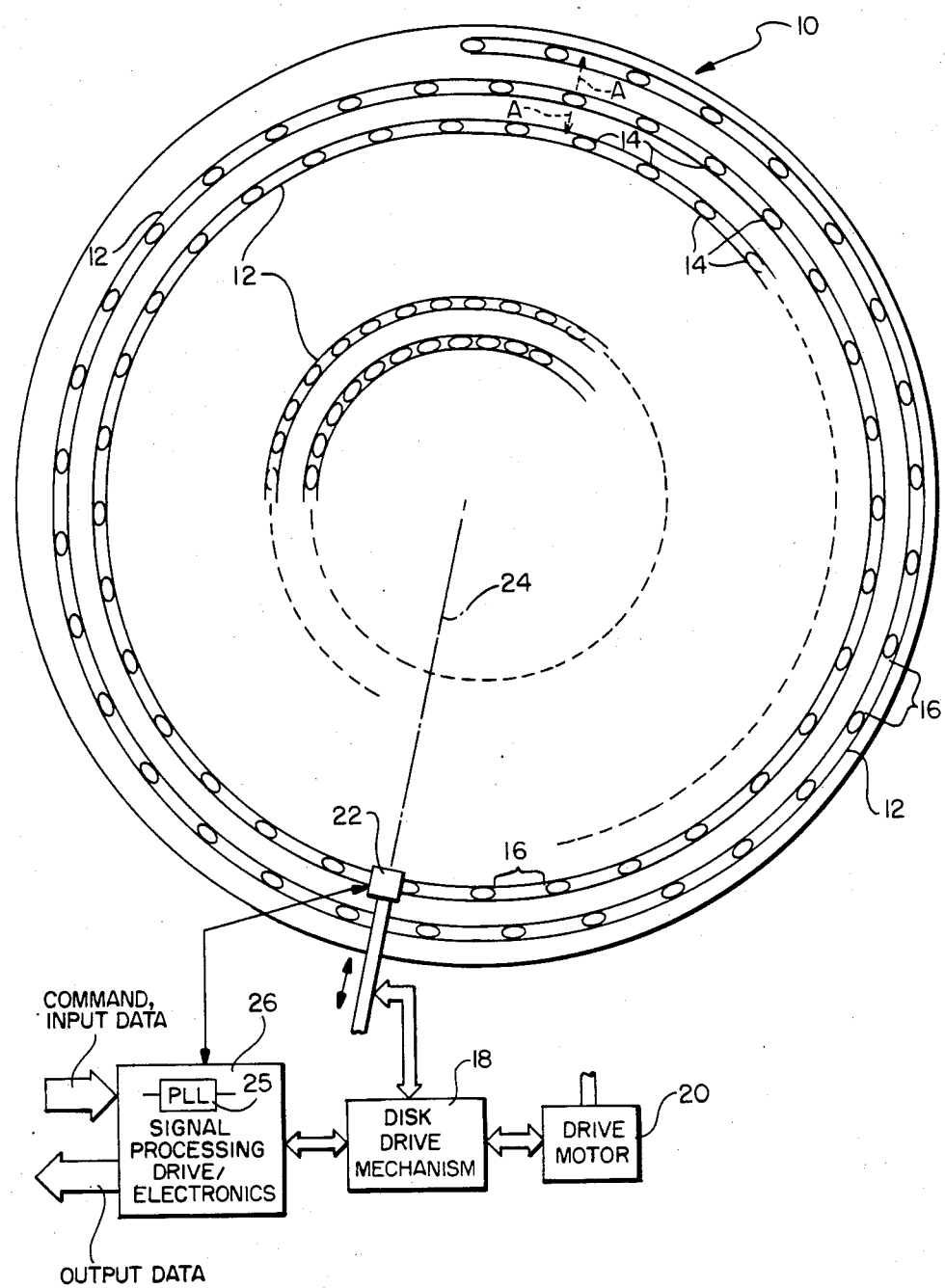
FIG. 1 is a schematic of disk drive apparatus together with an enlarged top view of a disk illustrating an elongate spiral record track having pre-written tracking pads angularly spaced equally along the record track.

FIG. 1 shows an information-bearing disk 10 (magnetic, magneto-optical, or optical) having an elongate record track 12 which spirals inwardly about the center of the disk to form a succession of equally spaced concentric revolutions of progressively decreasing radii. As made apparent hereinbelow, each track revolution may also be in circular form.

The disk 10 has pre-written indicia, preferably in the form of discrete tracking pads 14 which serve their customary function of tracking control; they also function for recording data on track segments 16 between adjacent pads. From the description to follow, it will be apparent to those skilled in the art that the pads 14 may also serve for playing back user data from each track segment 16.

For those purposes, the tracking pads are angularly spaced equally, relative to the center of the disk 10, throughout the record track 12. With the disk 10, the length of each full revolution and the linear distance between adjacent tracking pads 14 are such that each tracking pad is not aligned radially, as shown in FIG. 1, with the corresponding tracking pad on the adjacent track revolution (either the adjacent inner or the adjacent outer revolution). For use of the invention to be described, however, the tracking pads 14 may be aligned radially, as is disclosed in the aforementioned patent application Ser. No. 943,396.

To record user data on, or play back from, a track segment 16, a drive mechanism 18 causes a spindle drive motor 20 to rotate the disk 10 while a read/write transducer head 22, also under the control of the drive mechanism, traces the record track 12 by continuous radial movement along a reference line 24. In doing so, the head 22, in response to each tracking pad 14, provides a clock synchronization pulse which can then be used by a phase-locked loop (PLL) 25 of a microprocessor-based signal processing and drive electronics 26 for writing data onto or play back of data from each track segment 16, even in the presence of fluctuations in the desired speed of the disk 10.

As disclosed hereinbefore, each tracking pad 14 on any one revolution does not align radially with the corresponding tracking pad on the adjacent track revolution. Accordingly, when the drive mechanism 18 causes the transducer head 22 to make a stepwise movement (discrete) in the radial direction, as shown by the arrows A, to jump from one revolution to another revolution, there is a discontinuity in the periodicity of the timing between the first tracking pad 14 accesssed while tracing the "new" track (the destination track) and the last tracking pad encountered prior to leaving the "old" track (the original track). Since the aforementioned clock pulses are synchronized with the tracking pads 14, the PLL 25 "sees" a phase error which prevents proper data transfer as the PLL attempts to correct for the phase error.

The invention requires improving the response time of the PLL to a track-jump operation of drive mechanism 18. Before describing specifically the means by which the object of the invention is achieved, consideration shall first be given to a presently preferred embodiment of the PLL 25 (FIG. 2).

A phase detector 30 functions to measure the phase relationship between tracking pad synchronization pulses, the frequency of which corresponds to the actual speed of the disk 10, and an output clock signal of the PLL 25, the frequency of which serves for controlling the rate at which data is transferred to or from the disk.

To that end, the phase detector 30 provides, at its UP output, a pulsed signal the duration of which is proportional to the relative timing (leading or lagging) between corresponding cycles of the tracking pad signal and the output clock signal derived therefrom. The detector 30 further provides, at its DOWN output, a pulsed signal the duration of which is proportional to the corresponding cycle of the clock signal. Phase detector apparatus of this general type is well known in the art and can be found in a variety of publications, two of which are U.S. Pats. Nos. 4,422,176 and 4,535,459.

Charge pump circuitry 32 serves to control the charge level of a capacitor 34 in accordance with the phase relationship between the clock signal and the input tracking pad signal. That phase relationship is measured by the difference between the durations of the respective signals at the UP and DOWN outputs of the phase detector 30. To that end, the charge pump circuitry 32 adds and removes charge from the capacitor 34, respectively, in proportion to the pulsed signals at the UP output and the DOWN output of the detector 30. The result of this operation is that the capacitor 34 receives a net positive or negative error voltage which has a magnitude indicative of the magnitude and the direction of the phase error between the clock signal and the tracking pad signal.

A voltage controlled oscillator (VCO) 36 serves to actually produce the clock signal. For that purpose, the VCO 36 functions to adjust the frequency of the clock signal in accordance with the frequency of the tracking pad signal, and thereby in proportion to the speed of the disk 10.

A feature of the PLL 25 is that it "holds" the frequency of the clock signal in the absence of a tracking pad signal, such as when a track jump occurs. To that end, the time constant of the PLL 25 is selected to be at least as long as the time needed to move the transducer head 22 radially from one track to any other track. For that purpose, the capacitor 34 acts as a near perfect integrator and holds the error voltage at a constant level when there is no tracking pad signal at the input of the phase detector 30. To that end, the capacitor 34 has a capacitance of about one microfarad (1 uf) to provide a time constant in excess of one-half of a millisecond (0.5 ms).

During a recording operation it is important that data is prevented from being written on the tracking pads 14. If the speed of the disk 10 is too fast, the tracking pad signal occurs at a higher frequency. This causes a more positive error voltage to be produced which acts to increase the VCO output frequency and thereby the rate at which data is caused to be written onto the disk; conversely, if disk speed is too slow, the tracking pad signal occurs at a lower frequency. When this happens, the error voltage is reduced which serves to decrease the VCO output frequency and thereby the rate at which data is transferred to the disk.

Since each tracking pad 14 occupies a certain space on the disk 10, to the exclusion of data, it is highly desirable that the number of tracking pads is minimized, relative to the amount of data recorded, without compromising the integrity of a tracking control system or impairing the clock signal. In other words, the frequency of the tracking pad signal is well below the frequency of the clock signal. In a preferred embodiment, the ratio of the frequencies of the two signals is 480:1.

To permit the phase detector 30 to measure the phase relationship between the high-frequency clock signal and the lower-frequency tracking pad signal, a frequency divider 38, serially connected in the feedback loop of the PLL 25, serves to divide the frequency of the PLL output (the clock signal) by a fixed amount corresponding to the ratio of the nominal frequencies of the two signals, i.e. 480. That ratio causes the nominal frequency of the output of the divider to be the same as the frequency of the tracking pad signal when the disk 10 is rotating quiesently at a desired speed.

To that end, the frequency divider 38 includes a counter 39 which serves to change the output state of the divider from a high level to a low level or vice versa each time a predetermined number of cycles—480—of the output clock signal occurs. With each change in the output of the divider 38, the counter 39 initiates a new cycle by resetting its count.

Now that the operation of the PLL 25 has been described, we now focus on circuitry for meeting the full requirements of the invention. A flip flop 44 serves for inhibiting the input of the PLL 25 during a track jump. For that purpose, the flip flop 44, when its output is high, disables the phase detector 30 and the frequency divider 38 and, when its output is low, reenables the phase detector and the frequency divider.

The invention provides for resetting the PLL 25 to match the phase of the tracking pads immediately after a track jump. For that purpose, a one—shot 45 and a dual-input AND gate 46 serve to match the phase of the tracking pad frequency on a newly acquired track with the phase of the clock signal frequency. To that end, the one-shot 45 functions to enable the AND gate 46 when the phase detector 30 is reenabled. The AND gate 46, in turn, serves to reset the counter 39 when the transducer head 32 reads the first tracking pad on the new or destination track after the phase detector 30 is reenabled.

Figure 3:
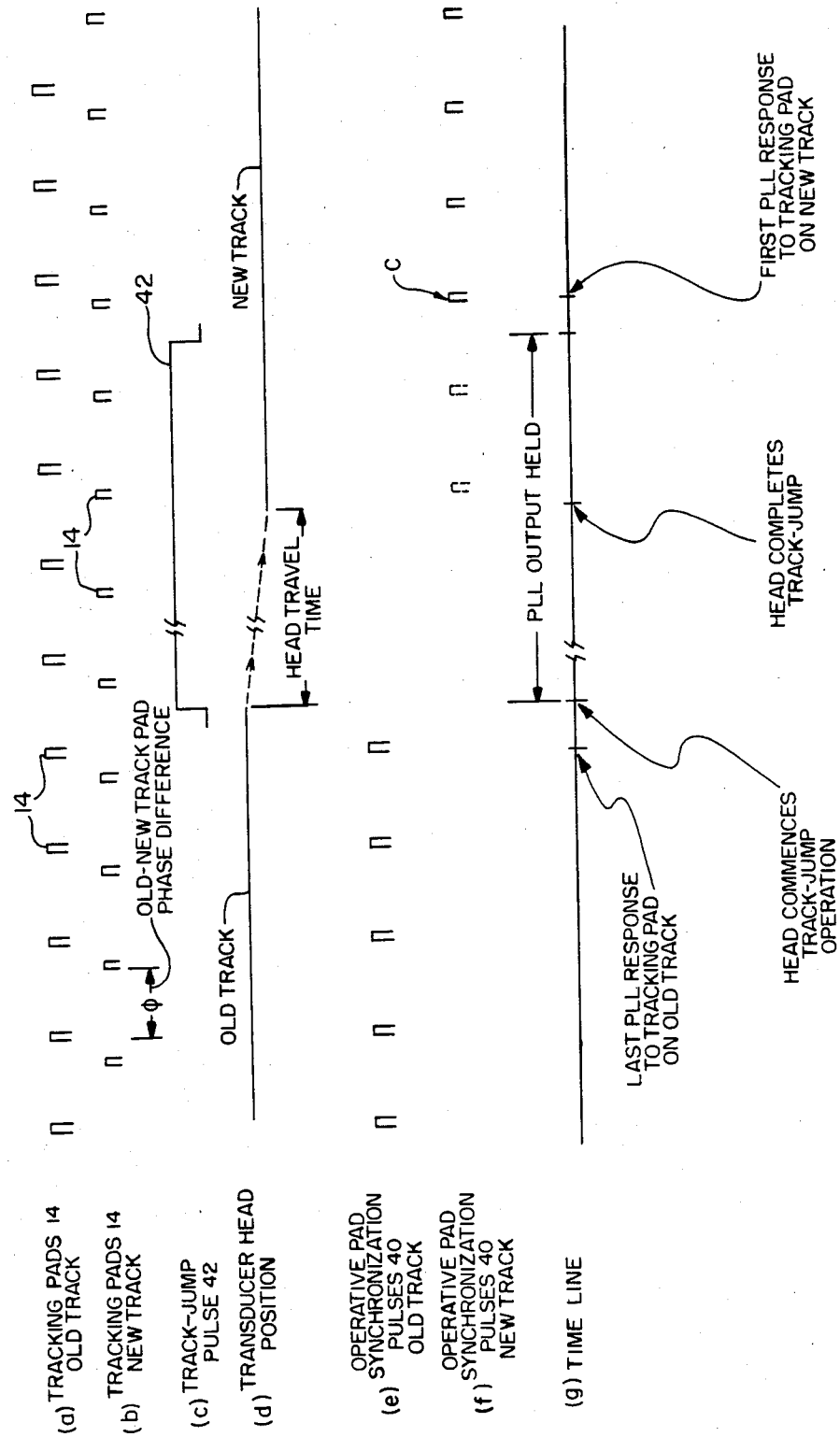
FIG. 3 is a series of illustrations useful in explaining the operation of the circuitry of FIG. 2.

FIG. 3 shows various waveform diagrams and other illustrations useful in explaining the operation of the invention during a track jump. (The letters associated with the waveform diagrams are indicated at the appropriate points in the schematic of FIG. 2 to further facilitate understanding of the invention.)

FIGS. 3(a) and 3(b) illustrate, respectively, the pattern of tracking pads 14 on a track revolution currently being traced by the transducer head 22 (referred to as the "old track") and the destination track (the "new track"). Because the pads 14 are misaligned radially, there is a difference in phase, $\phi$, as shown, between each tracking pad 14 of the old track and the corresponding tracking pad on the new track.

A train of pulses 40 (FIGS. 2 and 3(e)), corresponding to the tracking pads 14 on the track revolution being traced by the transducer head 22, provides a signal to an input of the phase detector 30. Similarly, the frequency divider 38, by means of the clock signal from the VCO 36, provides a pulsed output signal the frequency of which corresponds to the actual speed of the disk 10. The frequency of the clock signal changes in response to the actual timing of each tracking pad pulse 40, which occurs as a function of fluctuations in the speed of the disk 10.

When a track-jump operation commences, illustrated in FIG. 3(d) and the time line of FIG. 3(g), the aforementioned signal processing and drive electronics 26 applies a track-jump pulse 42 (FIG. 3(c)) to the input of the flip flop 44. The output of the flip flop 44, which is normally low, goes high to inhibit the input of the phase detector 30 and to disable the counter 39 of the frequency divider 38. When the former occurs, the voltage applied to the capacitor 34 remains at a constant level corresponding to the phase relationship between the current write clock signal and the tracking pad signal 40 from the old track. At that point, the frequency of the write clock is held at a constant level.

The duration of the track-jump pulse 42 is fixed and is selected to exceed the time required for the transducer head 22 to make its piecewise move radially to another track revolution, as illustrated when comparing FIG. 3(c) to FIG. 3(d). This assures that the PLL 25 is not reenabled before the head 22 reaches its destination track.

When the head 22 actually arrives at its destination track, the pad synchronization pulses 40 read from the new track have no influence on the PLL 25 as long as the track-jump pulse 42 remains high. This is illustrated by the two phantom-line pulses of FIG. 3(f) and the time line of FIG. 3(g).

When the track-jump pulse 42 terminates, the output of the flip flop 44 returns to its normal low-level state. When this occurs, the input of the PLL 25 is released; that is, the phase detector 30 and the frequency divider 38 are reenabled. At the same time, the one-shot 45, in response to the negative-going transition at the output of the flip flop 44, enables the AND gate 46.

In the embodiment of FIG. 2, the output frequency of the PLL 25 remains constant, however, until the transducer head 22 accesses (reads) the next tracking pad 14 on the new track, denoted C in FIG. 3(f). At that time, the phase detector 30 causes the charge pump 32 to return to adjusting the voltage on the capacitor 34, and thereby the frequency of the VCO 36, in accordance with the phase relationship between the clock signal and the tracking pad signal 40 from the newly acquired track. In parallel with that operation, the AND gate 46 clocks the tracking pad pulse denoted C to the divider 38, which resets its counter 39. Thus, the phase of the write clock signal is now matched to the new tracking pad signal. Since only the location or phase, but not the frequency, is different between the tracking pads 14 on the new track and those on the old track, the PLL 25 immediately begins to produce a clock signal whose frequency and phase are functionally related to the actual speed and location of the tracking pads, respectively, of the newly accessed track.

When the spindle drive motor 20 is changing speed such that there is a phase error between the output of the divider 38 and the tracking pad signal 40, the clock signal will change, but not immediately, as the phase comparator 30 responds to this phase error. A phase error at track jump is likely to still exist after the jump is completed.

Figure 4:
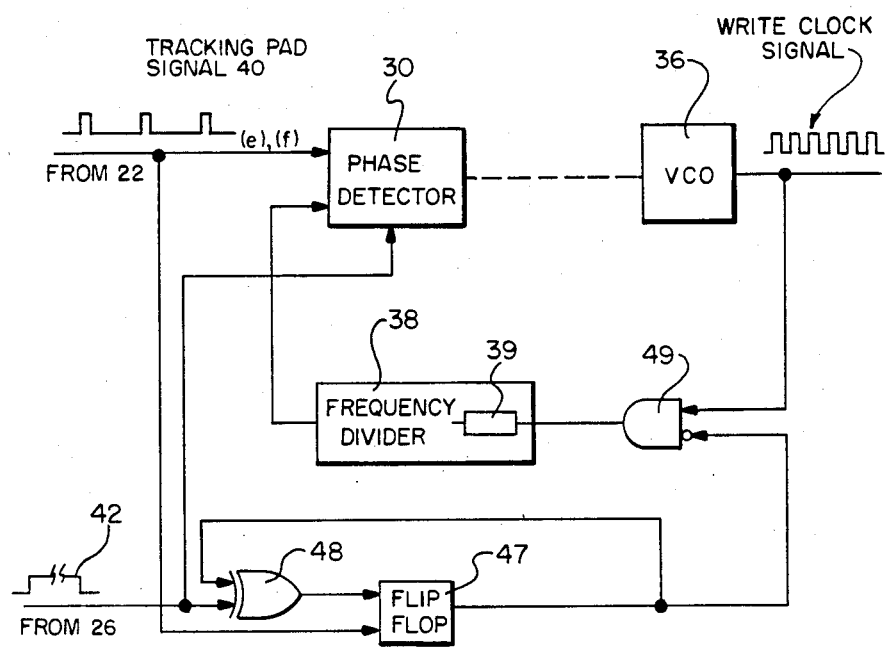
FIG. 4 is a partial schematic in block diagram form of an alternate preferred embodiment of circuitry for controlling the frequency and phase of a write clock signal.

In an alternative preferred embodiment of FIG. 4, any phase difference between the clock signal of the PLL 25 and the tracking pad signal is stored just before a track jump. Then, after completion of the track-jump operation, the PLL is reset to have the same phase difference with respect to the tracking pads of the new track. For storing any phase difference, a D flip flop 47 serves to inhibit the transmission of the write clock signal to the counter 39 of the frequency divider 38 from the time a first tracking pad pulse occurs after a track-jump operation is initiated until the first tracking pad pulse occurs after the jump is completed. To that end, an exclusive OR gate 48 causes the D flip flop 47 to hold its output high in response to a tracking pad pulse after the track-jump pulse 42 occurs. The relatively slow response time of a mechanical tracking actuator to a track-jump drive signal can be relied upon for permitting the transducer head 22 to produce a tracking pad pulse after the leading edge of the track-jump pulse 42.

A gate 49 receives the output of the D flip flop 47 to control the transmission of the write clock to the counter 39. When transmission of the write clock is inhibited, the counter 39 holds a count related to the phase difference between the write clock and the tracking pad signal. After the completion of the jump, i.e. after the trailing edge of the track-seek pulse 42, the D flip flop 47 reenables the gate 49 in response to the first tracking pad pulse after the jump. The counter 39, in response to the resuming of the transmission of the write clock, continues its counting function from the value stored when the jump was initiated. Thus, the phase difference is maintained from the beginning to the completion of the jump.

FIG. 5 shows in block diagram form, exemplary circuitry 50 for writing data between equally spaced tracking pads 14 preformatted on a disk 10. To that end, each recorded tracking pad 14 is readily distinguishable from recorded user data and thereby permits tracking control apparatus to also maintain the read/write transducer head 22 on a track center line during a playback mode. For that purpose, each tracking pad 14 preferably consists of a sequence of representations corresponding to a predetermined number, preferably eight (one byte), of bit cells without transitions. Thus, a tracking pad 14 would consist of a mark eight bits long on an optical disk and flux lines emanating in the same direction from eight consecutive bit cells on a magnetic disk. Such a byte sequence is readily distinguishable from a data field normally encoded using the well known Miller DMM (or MFM) encoding technique, because the time between successive signal transitions, either MFM pulses (magnetic recording) or DMM transitions (optical recording), is normally at least one bit cell, but is normally never greater than two bit cells.

Tracking pad detector circuitry 52 accepts, from the read/write transducer head 22, a DMM signal corresponding to preformatted information read from the record track 12 being traced by the head. Preferably the preformatted information includes a sector header (not shown) and tracking pads 14, including one in the header, angularly distributed equally throughout each sector. Because such tracking pad 14 recorded is readily distinguishable from any Miller-encoded pattern, the circuitry 52 operates to extract tracking pad information from the signal received, and to thereby produce a pad synchronization pulse 40 in synchronism with the reading of each tracking pad 14 on the disk 10.

In parallel with the operation of the detector circuitry 52, the head 22 feeds playback information to coder/decoder circuitry 54 which serves generally, in playback, to convert Miller-encoded information received to non-return-to-zero (NRZ) format. In that capacity, the circuitry 54 functions, in response to a sector header, to produce an index pulse 56 which indicates the start of each sector in the track 12 being traced.

In the opposite direction of information flow, the coder/decoder circuitry 54 serves to accept NRZ user data and an NRZ clock timing signal from serial/deserializer circuitry 58 and encodes the data into Miller format for recording by the head 22 on the disk 10. To that end, the serial/deserializer circuitry 58 receives an NRZ clock signal and user data in parallel form from a controller 60. Once recording starts, the circuitry 58 sends a data stream that is sufficient to fill one full sector of a track on the disk 10. To that end, the circuitry 58 transforms the parallel data stream into serial data and loads an internal buffer which is large enough to hold one full sector of data.

So as not to write over information that has been pre-written onto the disk 10—header information and periodic tracking pads—the circuitry 58 must be periodically interrupted during a write operation. To that end, the circuitry 58 maintains internal counters, based on the aforementioned clock signal, to keep track of position within a sector.

For that purpose, the counters of the circuitry 58 are initialized in response to each sector index pulse 56. The circuitry 58 then increments the counters in response to the aforementioned clock signal, which is supplied by the PLL 25. To that end, the coder/decoder circuitry 54 applies, to the PLL 25, a pad sample pulse 62, which is synchronized with the aforementioned tracking pad synchronization pulse 40.

With the tracking pads 14 being angularly spaced equally on any given track 12, the coder/decoder circuitry 54 produces a train of pad sample pulses 62, which would normally be equally spaced in time. With any fluctuation in the speed of the disk 10 from a desired level, however, a corresponding change in the timing of the pulses 62 occurs which, in turn, causes the PLL 25 to produce a corresponding change in its write clock signal.

The serial/deserializer circuitry 58, under the control of its internal counters, feeds a block of NRZ data in serial form to the coder/decoder circuitry 54 based on each pulse in the clock signal that is received. In other words, data is supplied for recording as a function of the rotational speed of the track 12 being traced; the internal counters of the circuitry 58, in turn, serve to periodically interrupt the NRZ data so as not to write over a pre-written tracking sector header or any tracking pad.

Other pre-written information, normally associated with a disk, may serve as appropriate indicia for producing a clock signal. For example, each track revolution may be divided into a number of equal-length sectors, with each sector having an encoded index pulse, or a sector address, etc., serving as an indicium for producing a clock signal.

The data storage capacity of the disk 10 may be increased by grouping the record track revolutions into a plurality of non-overlapping annular zones encircling the center of the disk 10. Preferably, the ratio of the inner (or outer) radius of any given zone to the corresponding radius of the adjacent inner zone is a constant which is the same for each adjacent pair of zones. A disk of this type is disclosed in U.S. patent application Ser. No. 900,197 filed on Aug. 25, 1986, the disclosure of which is incorporated herein by reference.

For maximum storage capacity for a disk arranged in this manner, the innermost track of each zone has the maximum bit cell density allowed by the system. While the transducer head 22 is tracing tracks within a given zone, the drive mechanism 18 causes the disk 10 to rotate at a given angular speed. To transfer data at a uniform rate, when the head 22 reaches the first track revolution in any other zone, the motor 20 causes a step change in rotational velocity of the disk 10 so that the linear velocity of the innermost track of the "new" zone is the same linear velocity as the innermost track of the "old" zone. To maintain the same frequency of the indicia as they sweep past the transducer head 22, the number of indicia per track revolution, from one zone to the next, is changed by the ratio of the corresponding inner radii of the two zones. Thus, the angular spacing between adjacent indicia varies from zone to zone. The indicia are, however, angularly spaced equally within each zone.

ADVANTAGEOUS TECHNICAL EFFECT

From the foregoing, it is apparent to those skilled in the data recording art that disk drive apparatus, in accordance with the invention, provides for phase locking a clock so as to synchronously transfer data subsequently to or from track segments between tracking pads angularly spaced equally throughout concentric record tracks encircling the center of the disk. In particular, the disk drive apparatus serves for improving the response time of data transfer when a read/write transducer head jumps radially from one record track to another track. To that end, the clock is immediately resynchronized after a track-jump is completed.

The invention has been described in detail with reference to the figures, however, it will be appreciated that variations and modifications are possible within the spirit and scope of the invention.

What is claimed is:

1. In a disk drive apparatus for use with a record storage disk having pre-written indica angularly spaced equally, relative to the center of the disk, throughout at least a subset of a plurality of concentric record tracks encircling the center of the disk, the length of each track revolution and the linear distance between adjacent indicia on the same track being such that the indicia, as viewed in the radial direction, may or may not be aligned from one revolution to the next revolution, said disk drive apparatus includes a read/write transducer head mounted for radial movement for reading indicia from each record track of a received disk to write and/or play back user data between the indicia, motor means for rotating the disk at a desired speed to cause the indicia on a record track to sweep past said transducer head at a corresponding rate, and phase-locked loop circuitry, coupled to said transducer head and responsive to a pulsed signal corresponding to the rate at which the indicia sweep past said transducer head, and thereby the actual speed of the disk, for producing an adjustable clock signal which causes the frequency at which user data is written onto the disk to be adjusted in accordance with the actual speed of the disk, wherein the improvement comprises:

said drive apparatus further includes control circuit means, coupled to said phase-locked loop circuitry and responsive to said transducer head making a stepwise movement in the radial direction to effect a track-jump operation from an original track to a destination track, for matching the phase of the clock signal with the phase of the indicia on the destination track in the presence of a difference in phase between the indicia on the original track and the indicia on the destination track, to maintain continuity in the frequency and phase of the clock signal between the time when the track-jump operation is initiated and the time when the track-jump operation is completed.

2. Disk drive apparatus as defined in claim 1 wherein said control circuit means includes means, responsive to the first indicia read on the destination track, for resetting the phase of said phase-locked loop circuitry to match the phase of the indicia on the destination track.

3. Disk drive apparatus as defined in claim 1 wherein said control circuit means includes (1) first means for storing a phase difference between the clock signal and the indicia on the original track when a track-jump operation is initiated, and (2) second means, coupled to said first means, for controlling said phase-locked loop circuitry so that the clock signal has the same phase difference with respect to the indicia on the destination track when the track-jump operation is completed.

4. Disk drive apparatus as defined in claim 1 wherein said control circuit means maintains continuity in the frequency and phase of the clock signal between the time when the last indicium was read by said transducer head on the original track and a first indicium is read on the destination track.

5. Disk drive apparatus as defined in claim 1 wherein said phase-locked loop circuitry has a time constant sufficient for latching the frequency of the clock signal after the last indicium on the original track was encountered and thereafter until the first indicium on the destination track is accessed by said transducer head, to maintain the frequency of the clock signal constant during the track-jump operation.

6. Disk drive apparatus as defined in claim 5 wherein said control means, in response to a track-jump operation, disables an input of said phase-locked loop circuitry for a predetermined time that is at least as long as the interval needed for stepwise radial movement of said transducer head from the original track to the destination track.

7. Disk drive apparatus as claimed in claim 6 wherein said control circuit means includes means for producing, in synchronism with the track-jump operation, a track-jump pulse having a predetermined duration which is greater than the interval needed for stepwise radial movement of said transducer head from the original track to the destination track, and a flip flop, responsive to the track-jump pulse and coupled to the input of said phase-locked loop circuitry, for causing an output of said phase-locked loop circuitry to hold the frequency of the clock signal constant during the occurrence of the track-jump pulse.

* * * * *